March 29, 1966 R. H. BIRNEY ETAL 3,243,199
TORSION SPRING VEHICLE SUSPENSION
Filed Oct. 23, 1963

ROBERT H. BIRNEY
ROBERT R. PETERSON
INVENTORS

BY John R. Faulkner
Clifford L. Sadler

ATTORNEYS

United States Patent Office 3,243,199
Patented Mar. 29, 1966

3,243,199
TORSION SPRING VEHICLE SUSPENSION
Robert H. Birney, Birmingham, and Robert R. Peterson, Ann Arbor, Mich., assignors to Ford Motor Company, Dearborn, Mich., a corporation of Delaware
Filed Oct. 23, 1963, Ser. No. 318,288
12 Claims. (Cl. 280—124)

The present invention relates generally to torsion bar suspension systems, and more particularly to such a suspension employing a single leaf torsion spring.

Torsion springs have many advantages when employed in a vehicle suspension system. Certain difficulties may be encountered, however, in designing an efficient end attachment for the torsion springs. Many of the presently available attaching devices reduce the effective length of the torsion spring and thereby reduce its efficiency. In addition, these devices often introduce stress conditions which contribute to the early fatigue of the spring.

In view of the limitations of the prior art, it is an object of the present invention to provide a vehicle suspension having an end attachment for a torsion spring in which the spring is gripped along the edge of its end face.

It is a further object to provide an end attachment for a single leaf torsion spring in which the end attachment has a divergent slot that receives the end face of the spring.

A still further object of the invention calls for the employment of a Belleville spring having a central recess that receives the end of a torsion spring and functions as a spring seat.

The many objects and advantages of this invention will be fully comprehended from the following description and the accompanying drawings in which.

Figure 1:
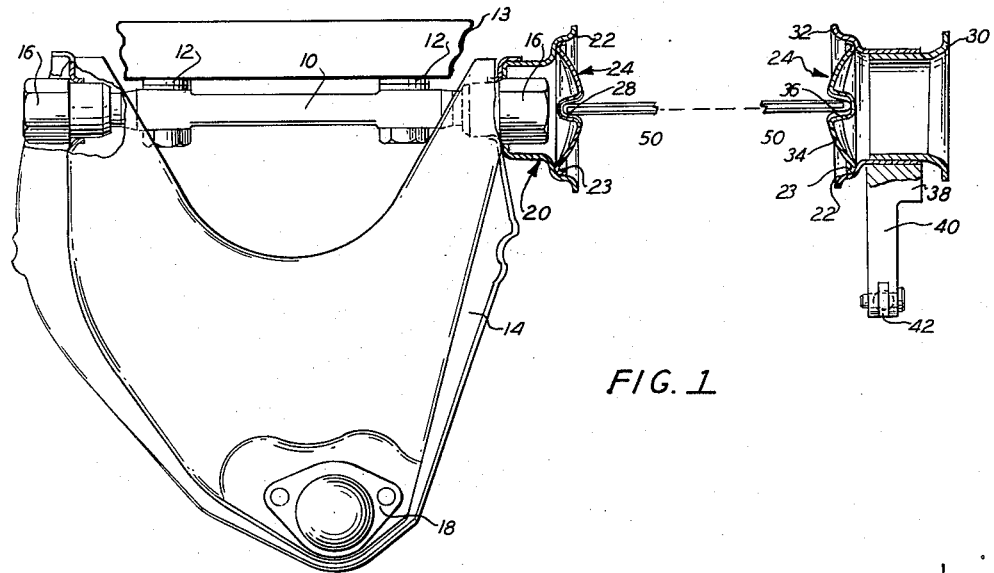
FIGURE 1 is a top elevational view of a vehicle suspension having a torsion spring and constructed in accordance with the present invention.

Referring now to the drawings and more particularly to FIGURE 1, an independent vehicle suspension incorporating the present invention is disclosed. A pivot shaft 10 is bolted at 12 to a vehicle frame member 13. An A-shaped suspension arm 14 is pivotally connected to the ends of the pivot shaft 10 by a pair of threaded bushings 16. A ball joint assembly 18 that has its socket member riveted to the outer end of the suspension arm 14. The ball stud portion of joint 18 is connected to the wheel support member of the independent suspension system.

A cup-shaped member 20 is welded to the arm 14 adjacent one of the threaded bushings 16. Member 20 presents a flared mouth 22 that extends away from the arm 14. The mouth 22 has an elliptical configuration and is provided with an annular groove 23 that receives a spring seat 24. Spring seat 24 is a sheet metal member with an elliptical periphery 26 that complements the configuration of the mouth 22 and nests within the groove 23.

As seen in FIGURE 1, the spring seat 24 has a central bulge with a groove 28 that extends along the major axis of the elliptical piece. The walls of the groove 28 diverge outwardly. Spring seat 24 is manufactured from spring steel and is resilient in the manner of a Belleville spring.

A second spring seat 34, identical in construction and configuration to spring seat 24, is provided. Spring seat 34 engages a collar 32 which rotatably surrounds a cylindrical member 30 that, in turn, is secured to a frame member of the vehicle. The collar 32 has an elliptical mouth portion that receives the spring seat 34 in the same fashion seat 24 is nested in mouth 22 of member 20.

Like spring seat 24, piece 34 is provided with a spring receiving groove 36 having sidewalls that diverge outwardly. The groove 36 is in alignment with the major axis of the elliptical piece.

Figure 2:
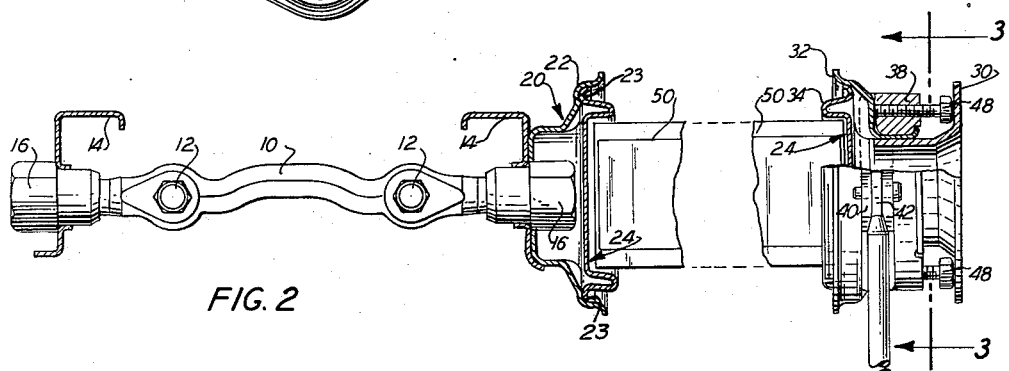
FIGURE 2 is a side elevational view of the suspension of FIGURE 1.
Figures 3, 4:
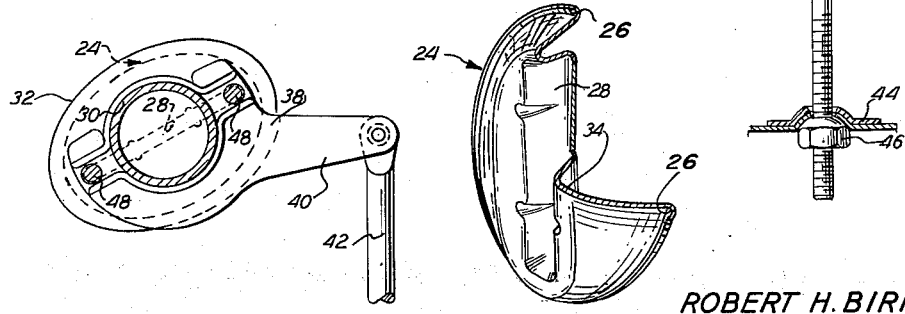
FIGURE 3 is a sectional view taken along section lines 3—3 of FIGURE 2.
FIGURE 4 is a perspective view of the spring seat that receives the end of the torsion spring with a portion of the seat cutaway for greater clarity.

A rigid casting 38 surrounds and engages the back side of the collar 32 as disclosed in FIGURES 2 and 3. An arm 40 extends from the side of the casting 38 and is connected by a threaded link 42 to a vehicle frame member 44. By tightening the nut 46 on link 42, the angular position of the member 32 and the spring seat 34 may be shifted relative to the frame support 30.

A pair of bolts 48 are screwed into the casting 38 and have their head ends contacting the support 30. The pivot shaft 10, spring seats 24 and 34 are in axial alignment and the bolts 48 constitute a means for positioning member 32 along their axis.

A torsion spring 50 is formed from a single band of spring steel. The ends of the spring 50 are cut square so that one end may be seated in the groove 28 of spring seat 24 with the edges of its end face in engagement with the diverging walls of the groove. In a similar fashion, the sharp edges of the other end face of the torsion spring 50 engage the diverging walls of the groove 36 of spring seat 34. The bolts 48 are adjusted to provide sufficient compression loading on the entire assembly of FIGURES 1 and 2 to maintain the torsion spring 50 trapped in position.

When the components of the suspension are assembled as in FIGURES 1 and 2, the nut 46 is rotated which, in turn, causes arm 40 to rotate spring seat 36. This action twists the torsion spring 50 and applies a spring preload to the suspension. When the suspension is installed in a vehicle, this preloading is needed to maintain the vehicle chassis at appropriate ride height relative to the ground. In addition to providing a device for adjusting preload, the link 42 carries the spring reaction.

When the suspension arm 14 rotates about the axis of the pivot shaft 10 during normal jounce and rebound movement, the single leaf torsion spring 50 will be twisted. This twisting action will resiliently resist the jounce movement of the wheel.

The band of spring steel which forms the torsion bar 50 has a rectangular configuration in a static condition. When the bar is installed in the suspension as shown in FIGURES 1 and 2 and twisted, in addition to forming a helix, there will be an elongation of the spring that will create an end loading on the spring seats 24 and 34. If the spring seats were rigidly constructed of forgings or castings, this end loading could be sufficient to fracture the seats. The spring seats 24, 34 are manufactured in the shape of Belleville springs so that the grooves 28 and 36 may move resiliently in accordance with deflection of the ends of the spring 50 caused by jounce and rebound movement.

By loading the spring 50 at the very edge of its end face, the entire length functions as a spring. This construction is unlike the normal arrangement where a socket is used to secure a torsion bar end. Under that situation, the portion of the bar within the socket is not loaded. Due to the resilient nature of the spring seats 24, 34 the application of forces to the ends of the spring 50 are uniformed and there are no points of stress concentration. The nature of the spring seats 24, 34 permit the grooves 28, 36 to move in and out as well as tilt.

The foregoing description discloses the presently preferred embodiment of this invention. Modifications and alterations may occur to those skilled in the art that will come within the terms of the following claims:

What is claimed is:

1. A vehicle suspension system having a frame, a suspension arm pivotally connected to said frame for jounce and rebound movement, a member having an elliptical mouth secured to said suspension arm, a sheet metal spring seat having an elliptical periphery position in said elliptical mouth, a second member having an elliptical mouth connected to said frame, a second spring seat having an elliptical periphery positioned in the mouth of said second member, each of said spring seats having a groove extending along its major axis, a flat thin torsion spring interposed between said spring seats and havings its ends positioned in said grooves, said spring seats being resiliently flexible to accommodate axial and tilting movement of the ends of said torsion spring.

2. A suspension system for a motor vehicle comprising a frame, a suspension arm pivotally connected to said frame for jounce and rebound movement, a member having an elliptical mouth secured to said suspension arm, a sheet metal spring seat having an elliptical periphery positioned in said elliptical mouth, a second member having an elliptical mouth rotatably connected to said frame, a second spring seat having an elliptical periphery positioned in the mouth of said second member, each of said spring seats having a groove extending along its major axis, a flat thin torsion spring interposed between said spring seats and having its ends positioned in said grooves, said spring seats being resiliently flexible to accommodate axial and tilting movement of the ends of said torsion spring during jounce and rebound movement of said suspension arm, adjustment means adapted to rotate said second member relative to said frame for preloading said spring.

3. A vehicle suspension system having a frame, a suspension arm pivotally connected to said frame for jounce and rebound movement, a first Belleville spring connected to said frame, a second Belleville spring connected to said arm, a thin flat torsion spring extending between said Belleville springs and having its ends torsionally rigid with said Belleville springs, said Belleville springs being resiliently flexible to accommodate movement by the ends of the torsion spring during jounce and rebound movement of said said suspension arm.

4. A vehicle suspension system having a frame, a suspension arm pivotally connected to said frame for jounce and rebound movement, a first spring seat secured to said frame, a second spring seat secured to said arm, a thin flat torsion spring extending between said spring seats and having its ends torsionally rigid with said seats, said seats being resiliently flexible to accommodate axial movement of the ends of the torsion spring during jounce and rebound movement of said suspension arm.

5. A spring system having sprung and unsprung members, a resilient spring seat secured to each of said members, a thin flat torsion spring interposed between said spring seats, each of said spring seats having a groove portion that receives one end of said torsion spring, said spring seats being adapted to permit axial movement of the ends of said torsion spring.

6. A spring system having sprung and unsprung members, a resilient spring seat secured to each of said members, a thin flat torsion spring interposed between said spring seats, each of said spring seats comprising a sheet metal member having a groove portion that receives one end of said torsion spring, said spring seats exerting a resilient force against axial movement of the ends of said torsion spring.

7. A spring system having sprung and unsprung members, spring seats secured to each of said members, a torsion spring having ends engaging said spring seats, one of said spring seats comprising a sheet metal member having a recess portion that receives one end of said torsion spring, said one spring seat being resiliently axially movable in response to displacement of one end of said torsion bar.

8. A spring system having sprung and unsprung members, a resilient spring seat secured to each of said members, a torsion spring having ends engaging said spring seats, each of said spring seats comprising a sheet metal member having a recess portion that receives one of the ends of said torsion spring, said spring seats exerting a resilient force against the ends of said torsion bar.

9. A suspension system for a motor vehicle comprising a frame, a suspension arm pivotally connected to said frame for jounce and rebound movement, a member having an annular portion secured to said suspension arm, a sheet metal spring seat having a periphery engaging said annular portion, a second member having an annular portion connected to said frame, a second spring seat having a diametral groove, a flat thin torsion spring interposed between said spring seats and having its ends positioned in said grooves, said spring seats being resiliently flexible to accommodate axial and tilting movement of the ends of said torsion spring during jounce and rebound movement of said suspension arm.

10. A vehicle suspension system having a support member, a suspension arm member pivotally connected to said support member for jounce and rebound movement, a Belleville spring connected to one of said members, a thin flat torsion spring extending between said Belleville spring and the other of said members, said torsion spring having a torsionally rigid connection with said Belleville spring and said other member, said Belleville spring being resiliently flexible to accommodate limited movement by the end of said torsion spring during jounce and rebound movement of said suspension arm.

11. A vehicle suspension system having a frame, a suspension arm pivotally connected to said frame for jounce and rebound movement, a first spring seat secured to said frame, a second spring seat secured to said arm, a thin flat torsion spring extending between said spring seats and having its ends torsionally rigid with said seats, one of said seats being resiliently flexible to accommodate axial movement of the end of the torsion spring during jounce and rebound movement of said suspension arm.

12. A spring system having sprung and unsprung members, a spring seat secured to each of said members, a thin flat torsion spring interposed between said spring seats, one of said spring seats comprising a sheet metal member having a groove portion that receives an end of said torsion spring, said one spring seat exerting a resilient force against axial movement of said torsion spring.

References Cited by the Examiner

UNITED STATES PATENTS

| 1,712,219 | 5/1929 | Knudsen | 64—15 |
|---|---|---|---|
| 2,606,020 | 8/1952 | Anderson | 267—57 |
| 2,942,871 | 6/1960 | Kraus. | |
| 2,998,241 | 8/1961 | Eyb | 267—57 |
| 3,104,096 | 9/1963 | Eirhart | 267—57 |
| 3,104,097 | 9/1963 | Kozicki | 267—57 |

FOREIGN PATENTS 1,041,607   6/1953   France.

BENJAMIN HERSH, *Primary Examiner.*

LEO FRIAGLIA, *Examiner.*

A. HARRY LEVY, W. A. MARCONTELL,
*Assistant Examiners.*